Nov. 17, 1942.　　　J. M. BRONING　　　2,302,292
LAWN EDGER
Filed Nov. 25, 1941
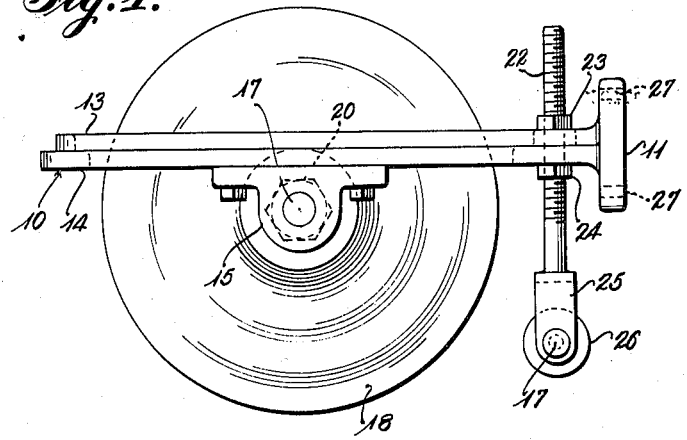
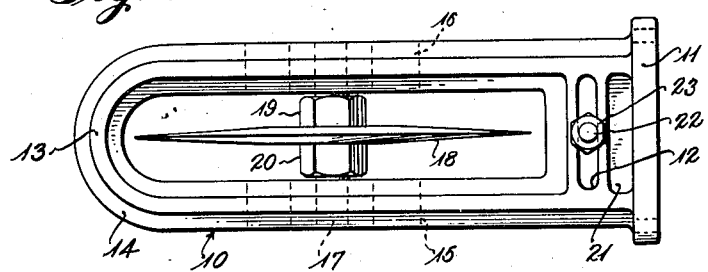
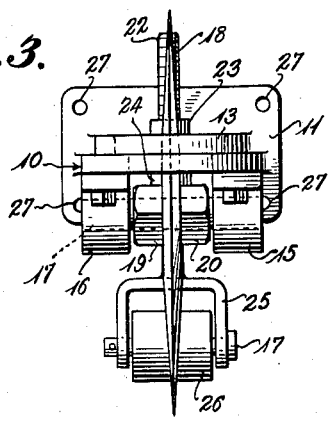
Inventor
John M. Browning
By Nelson J. Jewett
Attorney Patented Nov. 17, 1942

2,302,292

UNITED STATES PATENT OFFICE 2,302,292

LAWN EDGER

John M. Browning, Augusta, Ga.

Application November 25, 1941, Serial No. 420,429

1 Claim. (Cl. 30—292)

The invention relates to lawn edgers and has as an object the provision of a device for trimming the edges of lawns adjacent walks and the like.

Objects of the invention are to provide a device of this character that shall be exceedingly simple to produce; that shall be effective in action; that shall be adjustable as to depth of cut and as to the spacing from a sidewalk or the like; and that may be attached to other machines as for instance to a lawn mower.

Further objects of the invention will appear from the following description when read in connection with the accompanying drawing showing an illustrative embodiment of the invention, and wherein:

Figure 1 is a side elevation;

Fig. 2 is a plan view; and

Fig. 3 is an end view seen from the left of Figure 1.

As shown the device comprises a U-shaped frame 10 united to a face plate 11 at one end and as formed with a slot 12 for a purpose to be described. The frame may be formed as a single casting or may be made of separate parts welded or riveted together.

The frame is shown as formed of inverted T cross section having a portion 13 of less width than the portion 14, whereby rigidity is secured and material is saved.

Secured upon the lower side of the frame 10 are shown bearings 15, 16 carrying an axle 17 upon which a cutting disk 18 is secured by means of nuts 19, 20. The disk 18 is desirably formed of steel of a good quality to resist the service intended.

In the slot 12 formed in the cross member 21, there is secured a vertical stem 22 shown as screw-threaded and secured in the slot by lock nuts 23, 24 by which the vertical position of the stem in the frame may be adjusted.

Mounted in a yoke 25 at the lower end of the stem 22 is shown a gauge roller 26. This roller is designed to determine the depth to which the cutter disk shall cut and may be used as a gauge by allowing the roller 26 to contact the edge of the sidewalk or curb bordering the lawn. In that case the distance of the cutter 18 from the sidewalk or curb may be determined by lateral adjustment of the stem 22 in the slot 12.

The face plate 11 is shown as provided with holes 27 for reception of the bolts or studs securing the frame to a machine as a lawn mower.

The operation of the device will be obvious from the above description.

Minor chanegs may be made in the physical embodiment of the invention within the scope of the appended claim without departing from the spirit of the invention.

I claim:

A lawn edger comprising, in combination: a substantially U-shaped frame; a cutting disk revoluble between the parallel sides of said frame and upon an axis carried thereby; a cross member at the otherwise open end of the frame provided with a transverse slot; a standard secured in said slot upon an axis parallel with the plane of said disk; means carried by said standard to gauge the cutting depth of said disk; means to adjust said gauge means vertically; and a plate carried by said cross member for attachment to draft means.

JOHN M. BROWNING.